(12) United States Patent  (10) Patent No.: US 8,572,235 B1
Eslambolchi et al.  (45) Date of Patent: Oct. 29, 2013

(54) METHOD AND SYSTEM FOR MONITORING A COMPLEX IT INFRASTRUCTURE AT THE SERVICE LEVEL

(75) Inventors: Hossein Eslambolchi, Los Altos Hills, CA (US); John McCanuel, Bailey, CO (US); Prakash V. Vasa, Clarksburg, NJ (US)

(73) Assignee: AT&T Intellectual Property II, LP, Atlanta, GA (US)

( * ) Notice: Subject to any disclaimer, the term of this patent is extended or adjusted under 35 U.S.C. 154(b) by 996 days.

(21) Appl. No.: 11/268,235

(22) Filed: Nov. 7, 2005

(51) Int. Cl.
*G06F 15/173* (2006.01)
(52) U.S. Cl.
USPC .......................... 709/224; 709/223; 709/229
(58) Field of Classification Search
USPC ........................................................ 709/224
See application file for complete search history.

(56) References Cited

U.S. PATENT DOCUMENTS

| | | | |
|---|---|---|---|
| 6,070,190 A * | 5/2000 | Reps et al. | ..................... 709/224 |
| 6,401,117 B1 | 6/2002 | Narad et al. | |
| 6,408,292 B1 | 6/2002 | Bakalash et al. | |
| 6,742,020 B1 | 5/2004 | Dimitroff et al. | |
| 6,763,377 B1 | 7/2004 | Belknap et al. | |
| 6,836,799 B1 | 12/2004 | Philyaw et al. | |
| 6,836,803 B1 | 12/2004 | Swartz et al. | |
| 6,862,711 B1 | 3/2005 | Bahrs et al. | |
| 6,885,641 B1 | 4/2005 | Chan et al. | |
| 6,892,324 B1 | 5/2005 | French et al. | |
| 6,983,317 B1 * | 1/2006 | Bishop et al. | ................. 709/223 |
| 2001/0044840 A1 * | 11/2001 | Carleton | ...................... 709/223 |
| 2002/0087383 A1 | 7/2002 | Cogger et al. | |
| 2004/0045014 A1 | 3/2004 | Radhakrishnan | |
| 2004/0078717 A1 * | 4/2004 | Allred et al. | ..................... 714/43 |
| 2004/0088405 A1 * | 5/2004 | Aggarwal | ..................... 709/224 |
| 2004/0221038 A1 * | 11/2004 | Clarke et al. | .................. 709/226 |
| 2004/0221296 A1 * | 11/2004 | Ogielski et al. | ............... 719/313 |
| 2005/0018611 A1 | 1/2005 | Chan et al. | |

* cited by examiner

*Primary Examiner* — Nicholas Taylor
(74) *Attorney, Agent, or Firm* — Hoffmann & Baron, LLP

(57) ABSTRACT

A method and system is disclosed for providing service level operational status associated with a complex information technology infrastructure. The method in accordance with the present invention allows a user to quickly determine the functionality of assets associated with the service level of a multi-tiered infrastructure, and to review status history of the assets, to assist in trouble shooting failures at the service or business level.

14 Claims, 10 Drawing Sheets

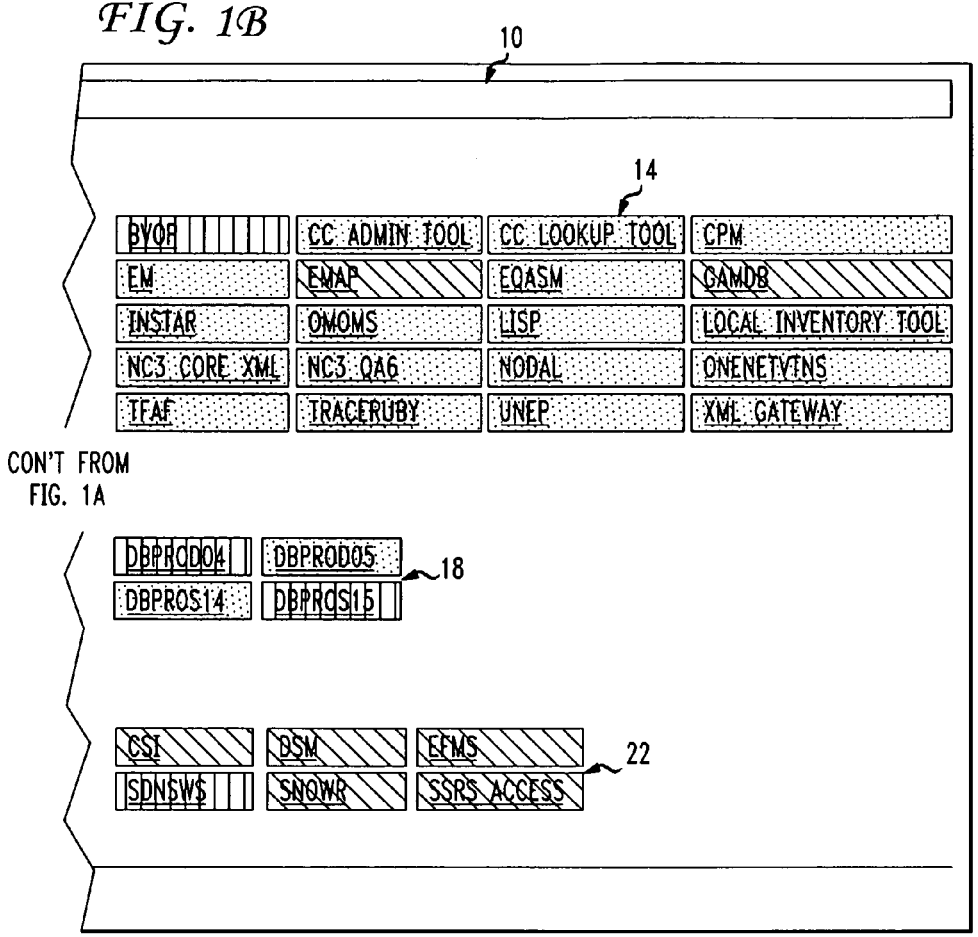
FIG. 1B
CON'T FROM
FIG. 1A
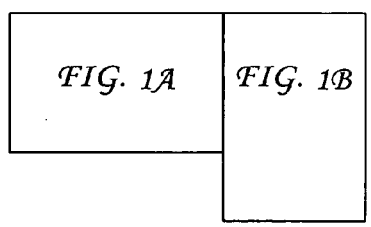
FIG. 1

FIG. 2

History of RUBY (?)

[TEST] [DEPENDENCIES]

| status | Timestamp |
|---|---|
| ▨ | 04/05/2005 06:35:36 PM ←—26 |
| ▨ | 04/05/2005 06:30:36 PM |
| ▨ | 04/05/2005 06:25:36 PM |
| ▨ | 04/05/2005 06:20:36 PM |
| ▨ | 04/05/2005 06:15:35 PM |
| ▨ | 04/05/2005 06:10:36 PM |
| ▨ | 04/05/2005 06:05:36 PM |
| ▨ | 04/05/2005 06:00:37 PM |
| ▨ | 04/05/2005 05:55:36 PM |
| ▨ | 04/05/2005 05:50:35 PM |
| ▨ | 04/05/2005 05:45:35 PM |
| ▨ | 04/05/2005 05:40:36 PM |
| ▨ | 04/05/2005 05:30:36 PM |
| ▨ | 04/05/2005 05:35:36 PM |
| ▨ | 04/05/2005 05:25:35 PM |
| ▨ | 04/05/2005 05:20:36 PM |
| ▨ | 04/05/2005 05:15:36 PM |
| ▨ | 04/05/2005 05:10:35 PM |

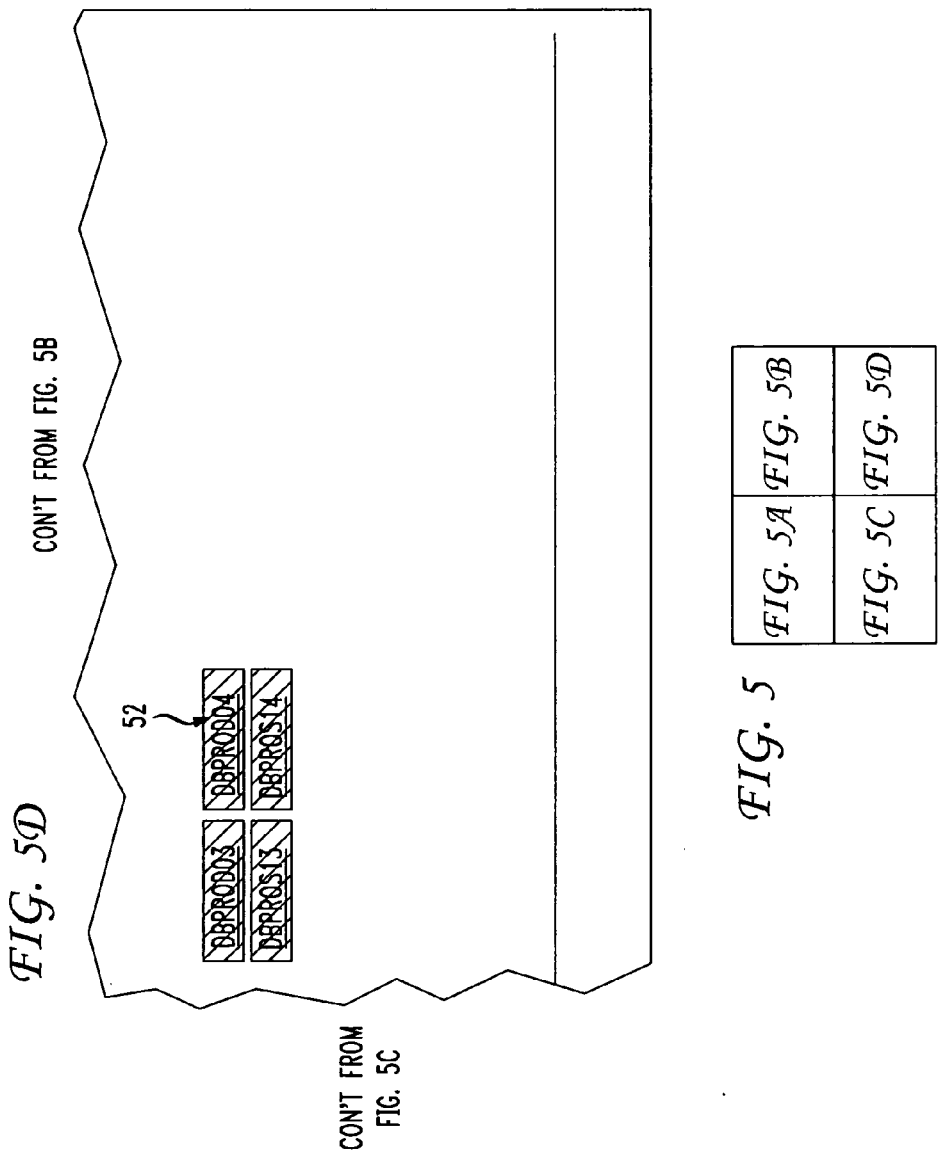

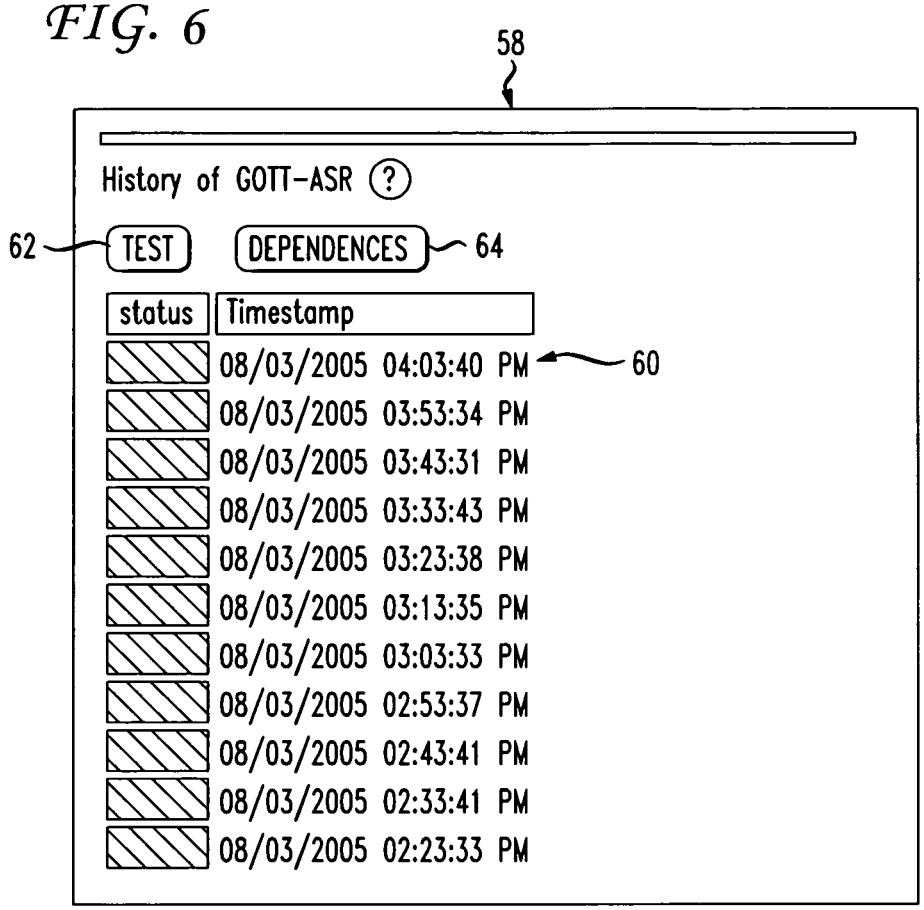

METHOD AND SYSTEM FOR MONITORING A COMPLEX IT INFRASTRUCTURE AT THE SERVICE LEVEL

TECHNICAL FIELD

The present invention generally relates to computer networks, and more particularly to a method and system for monitoring assets associated with the service level of a complex information technology infrastructure.

BACKGROUND OF THE INVENTION

In today's computing environment, a large number of organizations interconnect their local area networks ('LANs') to the Internet using a service provider network. Typically, the LANs are located at a single physical site and include network assets such as routers, bridges, and other networking equipment. Generally, the service provider's network spans the public Internet infrastructure and consists of networking and telecommunication equipment such as routers, switches, and access nodes. Typically, access nodes of the provider's network are used to interconnect the LANs.

Given the interconnectivity between service provider and organizational networks, network events (e.g., faults, outages or other conditions requiring support) can occur that affect services of interconnected networks. For example, a network failure on a particular access node may affect not only LANs attached to that node, but other access nodes configured to provide services to other organizational networks. Similarly, a network equipment failure on a particular organization's network may have a reverberating effect not only on the service provider's network but also on other organization networks.

In addition to network equipment or other resource level failures, network events can result from service level failures of an IT infrastructure. Resource level generally refers to information pertaining to assets that is used by a service provider to support the information technology service. In other words, resource level refers to features or parameters of information technology infrastructure assets that are important from a service provider's perspective and includes information regarding hardware assets that support the information technology service software. Service level generally refers to information pertaining to assets that is used by a service user or customer of the information technology service. In other words, service level refers to features or parameters of information technology infrastructure assets that are important from a service user's perspective and includes the functional aspects of the service that are felt or experienced through the information technology service software.

Failures at the service (or business) level may or may not result in error or alarm conditions at the resource level, e.g., alarms due to network communication hardware failures. However, failures at the service level can result in outage conditions from a business perspective that may involve long delays before the business service is restored, even when the resource level appears to be functioning normally.

Current efforts to trouble shoot network events are typically handled at the resource level by available tooling in which information is directly keyed in by a user into the tool, in response to an alarm or error condition, or by tooling that has an auto-discovery function responsive to such conditions. However, these tools cannot effectively penetrate the service or business impact part of the IT infrastructure.

As a result, there is a need for a tool that allows a user to quickly determine the functionality at the service level and identify failures among assets at the service level of a multi-tiered infrastructure. There is also a need to bridge the gap left by available tooling, which examines the resource level, to assist in trouble shooting failures at the service or business level.

SUMMARY OF THE INVENTION

A method and system for providing operational status at the service level of a complex information technology infrastructure is provided. The method and system in accordance with the present invention allows a user to quickly determine the functionality of assets associated with the service level of a multi-tiered infrastructure, and to review a history of the status of a selected asset having service level features and performing a service level function, in order to assist in trouble shooting failures at the service or business level.

The present invention works with and complements the invention disclosed and claimed in co-pending, U.S. application Ser. No. 11/264,593, filed Oct. 31, 2005, entitled "Method and System of Providing Relationships and Dependencies of Assets Across Complex IT Infrastructure," commonly assigned to AT&T Corporation, which is incorporated herein by reference in its entirety. This co-pending application is directed to methods and systems that identify the relationships and dependencies between and among assets at the service level of the IT infrastructure. In one aspect, the methods and systems of that co-pending application identify the topology of the IT infrastructure for a given business service(s), including assets at both the service and resource levels. The present invention complements those methods and systems with methods and systems that provide service level operational status for the assets identified by those methods and system.

In one aspect, the invention is directed to a method of providing service level operational status associated with an information technology infrastructure. The method includes displaying a list of assets associated with the information technology infrastructure, in which the list includes at least one asset having a service level feature and performing at least one service level function; determining the service level operational status of the at least one asset; and displaying a status indicator representing the operational status of the at least one asset. Preferably, the operational status is the real time operational status of the asset.

In one embodiment, the list of assets includes assets selected from the group consisting of a database, back end system, application, schema, ETL project and combinations thereof.

Service level operational status can include an indication of a functional state of the at least one asset for performing the at least one service level function. Preferably, the functional state is selected from the group consisting of an unavailable state, functioning normal state and trouble state. Preferably, the method provides service level operational status for all or substantially all assets from said list of assets. The method also preferably includes displaying historical information associated with the service level operational status of a selected asset, from the list of assets, having a service level feature and performing at least one service level function, in response to receiving a request for the historical information associated with the selected asset. The method can also include determining current service level operational status for the selected asset, in response to receiving a request for the current service level operational status of the selected asset. In such an embodiment, a user can request that an immediate test be conducted to determine the current operational status of the asset.

In one embodiment, the method can also include displaying additional service level information associated with the selected asset and a business service supported by the information technology infrastructure, in response to receiving a request for additional service level information associated with the selected asset. The additional service level information can include service level information for all assets from the list of assets associated with the selected asset and the business service. Specific examples of service level information that can be displayed are provided in co-pending U.S. application Ser. No. 11/264,593, filed Oct. 31, 2005, entitled "Method and System of Providing Relationships and Dependencies of Assets Across Complex IT Infrastructure," commonly assigned to AT&T Corporation, which is incorporated herein by reference in its entirety. In a preferred embodiment, the method includes the ability to perform the Dependencies function for the selected asset, as described and claimed in that co-pending application.

In one embodiment, the step of displaying a list of assets can include categorizing assets contained in the IT infrastructure into different categories, grouping the assets by the categories and displaying the assets in groups by category. The categories of service level assets can include at least two categories selected from the group consisting of databases, back end systems, applications, schemas and ETL projects. The category groups can include a category heading or title identifying the type of assets contained in the group of assets.

In one embodiment, the step of displaying a list of assets can include categorizing all or substantially all assets associated with a business service supported by the IT infrastructure, which have at least one service level feature and perform at least one service level function, grouping such assets by the categories and displaying the assets in groups by category.

In one embodiment, the step of determining the service level operational status of the at least one asset can include performing a test routine associated with a service level function of said at least one asset, wherein the test routine requests a response from the asset, and evaluating the response or lack of response to determine the service level operational status of the asset. In one embodiment, wherein the at least one asset performs a plurality of service level functions, the step of determining service level operational status can include performing a test routine associated with each service level function performed by the asset, in which each respective test routine requests a response from said asset, and evaluating the responses or lack of responses to determine the service level operational status of the asset.

In one embodiment, the at least one asset is identified by displaying an asset identifier and the service level operational status of the asset is identified by a status indicator associated with the asset. The indicator can be a background color for the immediate area around the asset identifier, wherein the displayed background color indicates the status of the asset. The asset identifier can be a typed name of the asset or an icon unique to that asset. The color of the typed name or icon can be a status indicator. The background color of a box surrounding the identifier can also be a status indicator. For example, the color green can indicate that the asset is functioning normally, while red can indicate it is not functioning properly and gray can indicate the asset is currently unavailable.

In another aspect, the invention is directed to a process for providing a centralized user interface at an administrator terminal in a network for obtaining service level operational status associated with an information technology infrastructure. The process includes displaying a graphical user interface (GUI) at an administrator terminal. The GUI can include a plurality of interface components enabling a user to view a list of assets associated with the IT infrastructure and to observe the service level operational status of those assets. The process can also include receiving information input by a user identifying a selected asset and displaying, for the selected asset, a history of the service level operational status of that asset. Preferably, the process includes displaying all or substantially all assets associated with a given business service supported by the IT infrastructure.

The assets can include assets selected from the group consisting of databases, back end systems, applications, schemas, ETL projects and combinations thereof. In one embodiment, the assets can be assets selected from the group consisting of databases, back end systems, applications and combinations thereof.

In yet another aspect, the invention is directed to a computer readable medium containing instructions, which when executed, perform a method of providing service level operational status associated with an information technology infrastructure. The method includes displaying a list of assets associated with the information technology infrastructure, in which the list includes at least one asset having a service level feature and performing at least one service level function; determining the service level operational status of the at least one asset; and displaying a status indicator associated with the at least one asset. The method can also include displaying historical information associated with the service level operational status of a selected asset, from the list of assets, having a service level feature and performing at least one service level function, in response to receiving a request for the historical information associated with the selected asset.

Preferably, the step of displaying a list of assets can include categorizing the assets associated with the IT infrastructure into different categories, grouping the assets by the categories and displaying the assets in groups by category. The categories of assets preferably include at least two categories selected from the group consisting of databases, back end systems, applications, schemas and ETL projects.

In another aspect, the invention is directed to a system for providing service level operational status associated with an information technology infrastructure. The system includes a network, a memory device and a computing device in communication with the memory device. The memory device and computing device are respectively coupled to the network and are operative to perform the steps of displaying a list of assets associated with the information technology infrastructure, in which the list includes at least one asset having a service level feature and performing at least one service level function; determining the service level operational status of the at least one asset; and displaying a status indicator associated with the at least one asset. The memory device and computing device can also be operative to perform the step of displaying historical information associated with service level operational status of a selected asset, selected from the list of assets.

Preferably, the memory device and computing device are operative to perform the steps of categorizing assets associated with the information technology infrastructure into different categories, grouping the assets by the categories and displaying the assets in groups by category.

Additional features and advantages will be readily apparent from the following detailed description, the accompanying drawings and the claims.

BRIEF DESCRIPTION OF THE DRAWINGS

FIGS. 1, 1A, and 1B illustrates an example of a graphical user interface for displaying a list of assets associated with an IT infrastructure and showing the operational status of those assets.

FIG. 2 illustrates an example of a graphical user interface for displaying historical information associated with the service level operational status of an application selected from the list of assets shown in FIG. 1.

FIG. 6 illustrates an example of a graphical user interface for displaying historical information associated with the service level operational status of a software module selected from the list of assets shown in FIG. 5.

DETAILED DESCRIPTION OF THE PREFERRED EMBODIMENTS

Figure 1A:
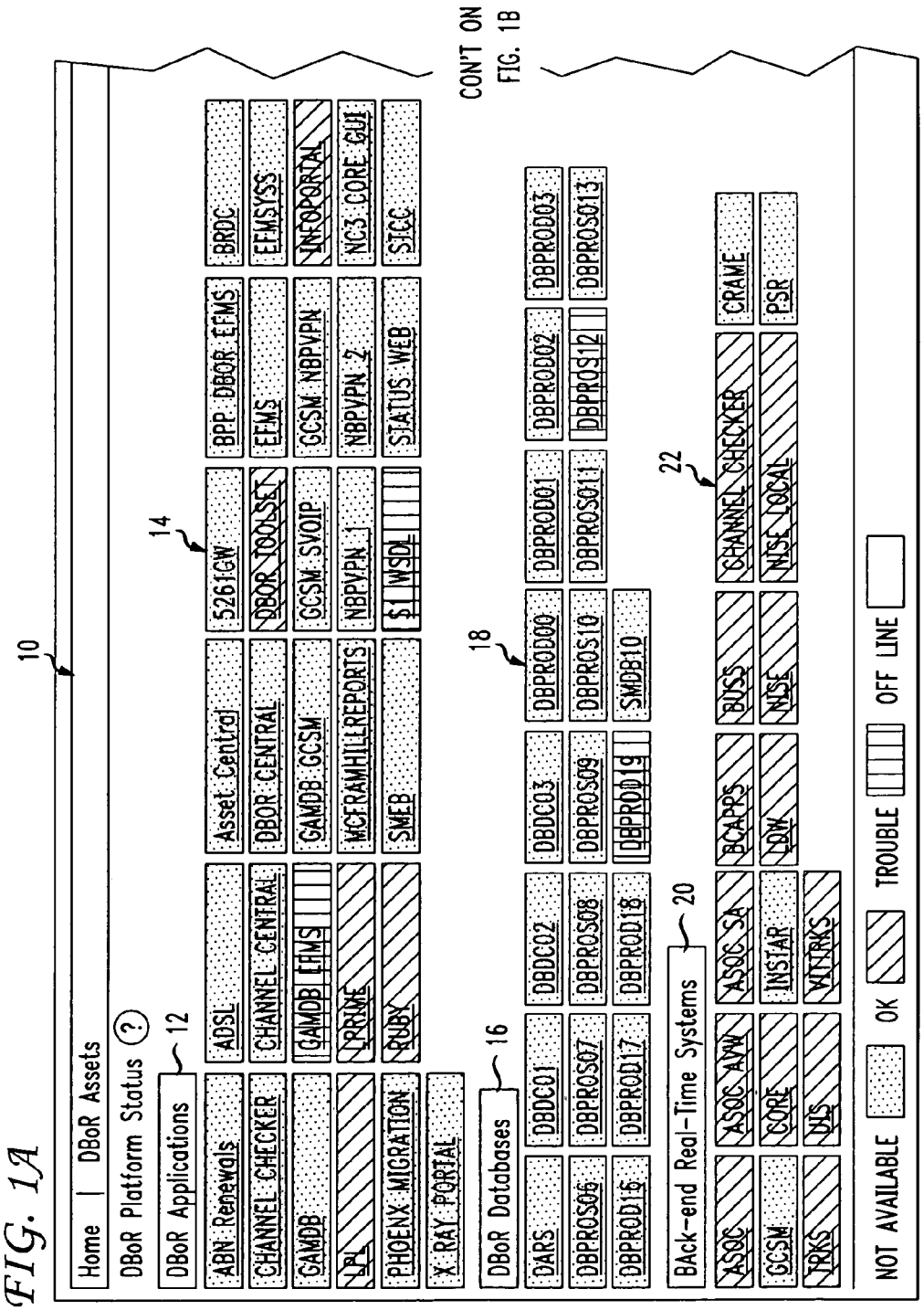

The invention is directed to a method and system for providing service level operational status associated with a complex information technology infrastructure. The method and system allows a user to quickly determine the functionality of assets associated with the service level of a multi-tiered infrastructure and to review the history of the status for a selected asset having service level features and performing at least one service level function with respect to business services supported by the IT infrastructure.

Business services generally refer to services or transactions that involve communication over a network. This may involve communication between different LAN's that can perform separate tasks. An example of a business service is a transaction (or transactions) that involves requesting and receiving information from a service provider, such as account or financial information. A single business transaction may require a large number of steps (e.g., 60 or 70 steps) that need to be performed accurately for the transaction to be successful. These steps will typically involve a number of assets having service level features or parameters.

In one aspect, the invention is directed to a method of providing service level operational status associated with an information technology infrastructure. The method includes displaying a list of assets associated with the information technology infrastructure, the list comprising at least one asset having a service level feature and performing at least one service level function; determining the service level operational status of the at least one asset; and displaying a status indicator associated with the at least one asset. The method can also include providing historical information associated with the operational status of a selected asset selected from the list of assets.

As used herein, the service level of an information technology infrastructure can be described generally as referring to layers seven through four of the Open System Interconnection (OSI) model and including software associated with specific business transactions. The service level relates to business application specific software from the perspective of the user of the information technology service. Service level refers to the features or parameters of the IT infrastructure assets that are important to the user in performing business services supported by the IT infrastructure. In other words, it is a top down perspective of the IT infrastructure, looking down from layer 7 of the OSI model. In that regard, layers seven through four of the OSI model are also known as follows: layer seven is the application layer, layer six is the presentation layer, layer five is the session layer and layer four is the transport layer.

The application layer supports application and end-user processes. Communication partners are identified, user authentication and privacy are considered, and any constraints on data syntax are identified. Everything in this layer is preferably application-specific. This layer provides application services for file transfers, e-mails, and other network software services. For example, Telnet and File Transfer Protocol (FTP) are applications that exist entirely in the application level. Tiered application architectures are also preferably part of this layer.

The presentation layer provides independence from differences in data representation (e.g., encryption) by translating from application to network format, and vice versa. The presentation layer works to transform data into a form that the application layer can accept. This layer formats and encrypts data to be sent across a network, providing freedom from compatibility problems. It is sometimes called the syntax layer.

The session layer establishes, manages and terminates connections between applications. The session layer sets up, coordinates and terminates conversations, exchanges and dialogs between applications at each end. It deals with session and connection coordination.

The transport layer provides transparent transfer of data between end systems, or hosts, and is responsible for end-to-end error recovery and flow control. It ensures complete data transfer.

In contrast to the service level, as used herein, the resource level can be described generally as referring to layers three through one of the OSI model and including hardware and software from the perspective of supporting the IT network. The resource level relates to network hardware and software from the perspective of the IT service provider, including network support and communications. Resource level refers to features or parameters of the IT infrastructure assets that are important to the service provider. In other words, it is a bottom up perspective of the IT infrastructure, looking up from layer one of the OSI model. In that regard, layers three through one of the OSI model are also known as follows: layer three is the network layer, layer two is the data link layer and layer one is the physical layer.

The network layer provides switching and routing technologies, creating logical paths, known as virtual circuits, for transmitting data from node to node. Routing and forwarding are functions of this layer, as well as addressing, internetworking, error handling, congestion control and packet sequencing.

At the data link layer, data packets are encoded and decoded into bits. This layer furnishes transmission protocol knowledge and management and handles errors in the physical layer, flow control and frame synchronization. The data link layer is divided into two sublayers: the Media Access Control (MAC) layer and the Logical Link Control (LLC) layer. The MAC sublayer controls how a computer on the network gains access to data and permission to transmit it. The LLC layer controls frame synchronization, flow control and error checking.

The physical layer conveys the bit stream, e.g., electrical impulse, light or radio signal, through the network at the electrical and mechanical level. It provides hardware means for sending and receiving data on a carrier, including defining cables, cards and physical requirements and specifications. Fast Ethernet, RS232, and Asynchronous Transfer Protocol (ATM) are protocols with physical layer components.

Examples of IT infrastructure assets that have service level features or parameters include clients, databases, back-end systems, applications, queries, schemas and ETL projects. Examples of assets that have resource level features or parameters include domains, machines, applications, databases and back-end systems. For example, the service level parameters for an application are the application name and the queries associated with that application, i.e., the functions the application is intended to perform, as this is what is important to the service user. On the other hand, resource level parameters for an application are the machines and domains that host or support the application, as this is what is important to the service provider. A similar analysis would apply to determine the service and resource level features for databases and back-end systems.

In one embodiment, the list of assets includes assets selected from the group consisting of a client, database, back end system, application, schema, ETL project and combinations thereof.

"Client" as used herein refers to software packages or modules that access a network to perform a business activity or service.

"Database" as used herein refers to a database or sub-database storing data utilized by business activity specific software. The name of the database is a service level feature, while the identity and location of the storage device for the database is a resource level feature.

"Domain" as used herein refers to a portion of a CPU or one or more machines which stores and runs business activity specific software.

"Back-End System" as used herein refers to an outside database or an interface with an outside database utilized by business activity specific software.

"Application" as used herein refers to software packages or modules that respond to a request from business activity specific software.

"Schema" as used herein refers to a defined structure for a database system or the relationship of tables and/or fields within a database system.

"ETL Project" as used herein refers to a set of related actions or prepackaged functions, i.e., Extract, Transform and Load functions, which respond to requests from business activity specific software.

"Machine" as used herein refers to a computing device that is referenced by a machine identifier and that supports the software and communications needed to execute a business transaction or service.

In one embodiment, the invention involves an application (or tool) that displays a GUI where a user can view a list of all or substantially all assets associated with one or more specific business service(s), having service level features and/or performing at least one service level function, and can determine the service level operational status of those assets. A service level function is a communication or transaction, e.g., a request for or transmission of information that is important from the viewpoint of a service user. For example, queries associated with an application involve a service level function. Queries are requests for information from a database in a specific language, e.g., structured query language (SQL).

Preferably, the GUI displays a dashboard view that includes a list of assets categorized by type of asset. The displayed assets can change color to reveal their operational status, i.e., their real-time status. For example, the listed assets can appear gray when not available, green when operating properly and red when not functioning properly. The user can then select a particular asset from the list of assets to display the status history for the asset.

In one embodiment, the different categories of assets can include Applications, Databases and Back-End Real Time Systems. The service level operational status of the assets can be determined using software modules (or drones) associated with each individual asset. The software module associated with a particular asset performs at least one test routine associated with that asset, wherein the test routine requests a response from the asset, and evaluates the response or lack of a response to determine the operational status of the asset. The response can be evaluated, for example, by comparing the response received to an expected response. If the expected response is received, the asset will be considered to be operating properly. An asset can also be tested by determining the time it takes to receive a response from a given asset. An appropriate test for a given asset can be readily determined by one skilled in the art.

Preferably, a test routine is performed on each service level function associated with each asset on the list of assets. For example, in the case of an application having multiple API's (application program interfaces) associated with it, a test routine can will be performed to check the operational status of each API. If any of the respective test routines fail, the asset will be considered to not be operating properly. The software modules preferably perform their respective test routines continuously at selected time intervals to provide essentially real-time status information for each of the assets. For example, each asset will be tested by its respective software module(s) every five minutes and the status can be displayed and updated each time the test routine(s) is/are performed.

In another embodiment, the different categories of assets can correspond to different layers of software modules associated with an operational support system for an IT service provider, as provided in U.S. patent application Ser. No. 11/239,832, filed Sep. 30, 2005, entitled "Tiered and Modular Approach to Operational Support Systems," commonly assigned to AT&T Corporation, which is incorporated herein by reference in its entirety. In such an embodiment, the categories of assets can be selected from the group consisting of application services, dark factory services, data services, databases, back-end real-time systems and combinations thereof.

In another embodiment of the invention, a user can select a particular asset from the list of assets to view the status history of that asset. For example, where the test interval is every five minutes, selecting the asset can display a listing showing the test results (or status) over the preceding two hours or a set number of tests, e.g., twenty tests. In one embodiment, a self test can be performed on the selected asset to immediately determine the current operational status of the asset. In one embodiment, additional service level information associated with the selected asset can also be displayed.

Referring to the Figures, snapshots of various displays from the GUI for the preferred embodiments described above are shown. The snapshots include displays of status screens and displays generated by selecting a specific asset to view the status history of that asset.

FIGS. 1, 1A and 1B illustrates an example of a graphical user interface (GUI) 10 for displaying a list assets for a given business service and showing the current status of those assets. The GUI 10 displays assets for the business service DBoR. The categories of assets displayed include Applications, Databases and Back End Real Time Systems. Under the Applications category heading 12 is displayed a group of selector boxes 14 that includes each of the Applications associated with DBoR. The selector boxes 14 provide an indication of the operational status for each of the Applications listed. The color of the selector box indicates the status of the particular Application. A gray selector box indicates the Application is not available, a green selector box indicates the Application is functioning properly, and a red selector box indicates the Application is not functioning properly. Not available status means that the application is not actively associated with DBoR.

Under the Databases category heading 16 is displayed a group of selector boxes 18 that includes each of the Databases associated with DBoR. The selector boxes 18 provide an indication of the operational status for each of the Databases listed. Similar to the Applications, discussed above, the color of the selector box indicates the status of the particular Database.

Under the Back-End Real-Time Systems category heading 20 is displayed a group of selector boxes 22 that includes each of the Back-End Real-Time Systems associated with DBoR. The selector boxes 22 provide an indication of the operational status for each of the Back-End Real-Time Systems listed. Similar to the Applications, discussed above, the color of the selector box indicates the status of the particular Back-End Real-Time System. A user can select any of the specific Applications, Databases or Back-End Real-Time Systems to display a status history of the selected asset.

In that regard, FIG. 2 illustrates an example of a GUI 24 displaying the status history for the Application RUBY. This display is generated by selecting the RUBY selector box from the group of Application selector boxes 14. The display provides a list 26 showing the status history for RUBY. The history includes the results of the last eighteen (18) status tests conducted at five-minute intervals.

Figure 3:
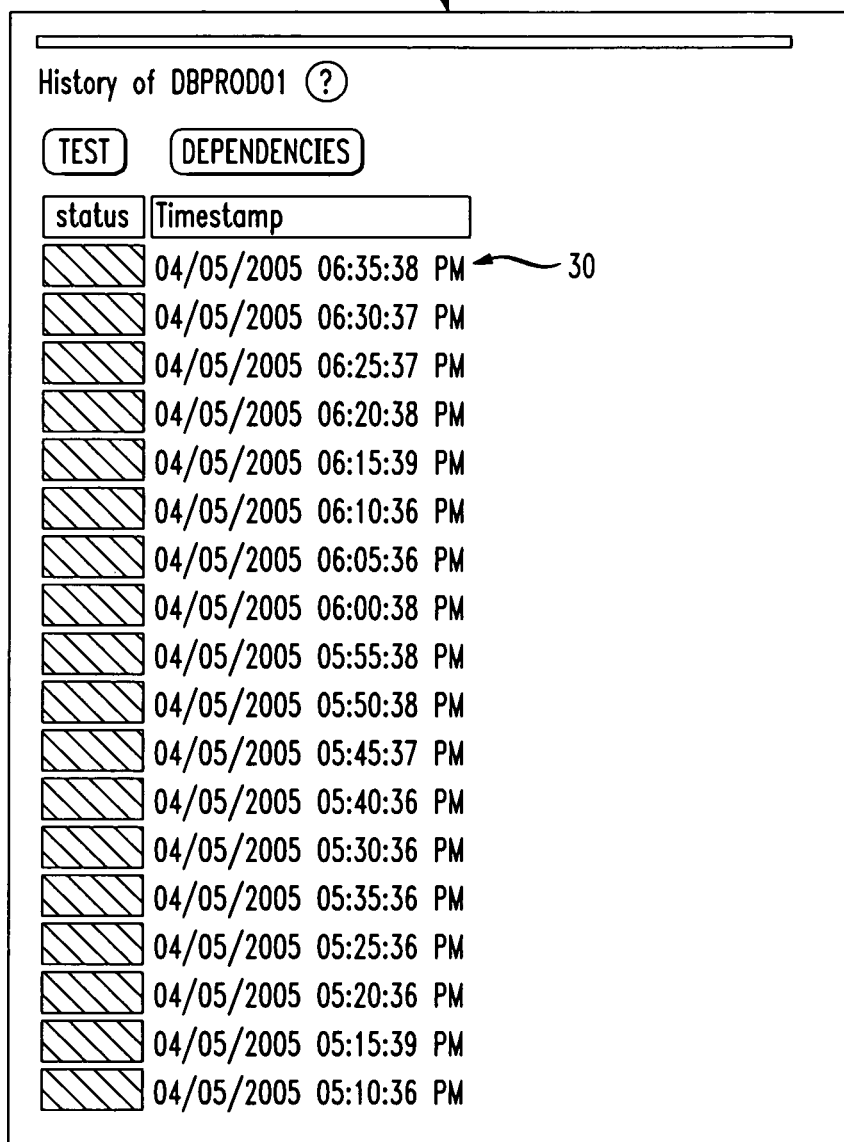
FIG. 3 illustrates an example of a graphical user interface for displaying historical information associated with the service level operational status of a database selected from the list of assets shown in FIG. 1.

FIG. 3 illustrates an example of a GUI 28 displaying the status history for the Database DBPROD01. This display is generated by selecting the DBPROD01 selector box from the group of Database selector boxes 18. The display provides a list 30 of the status history for DBPROD01. The history includes the results of the last eighteen (18) status tests conducted at five-minute intervals.

Figure 4:
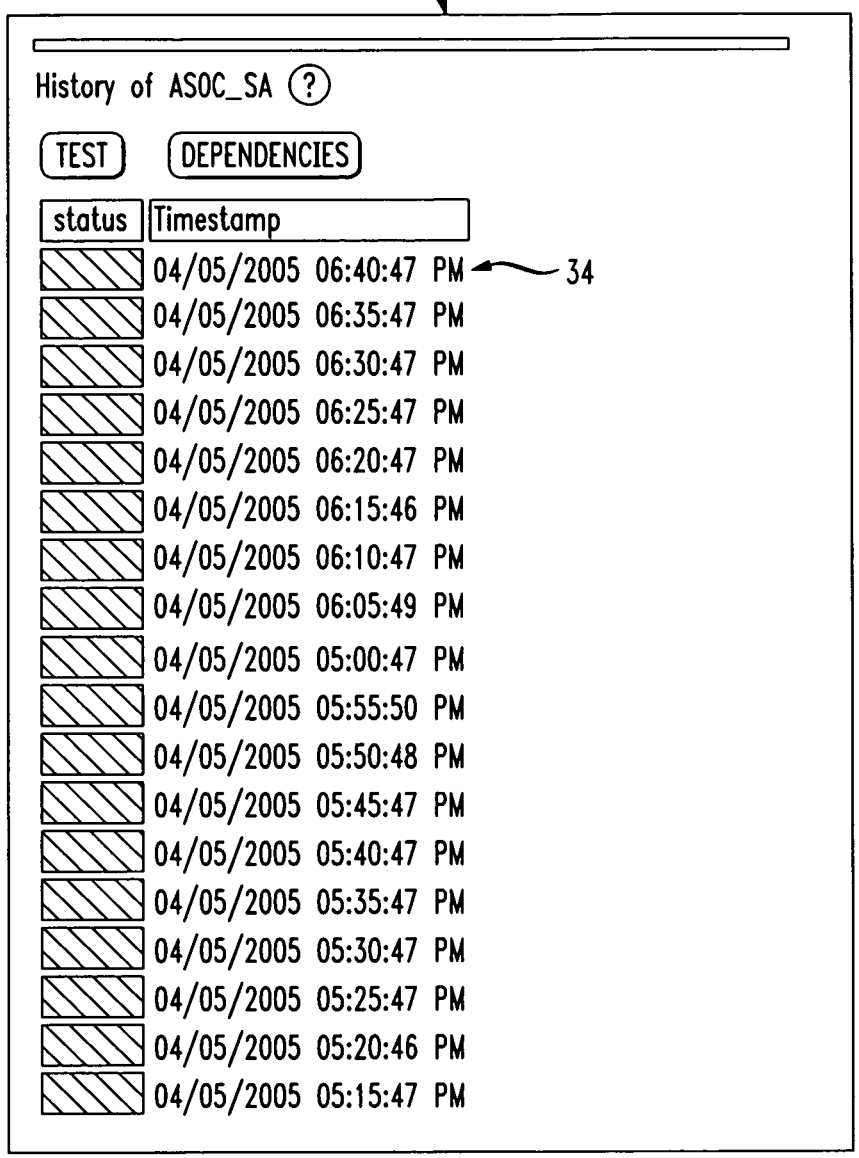
FIG. 4 illustrates an example of a graphical user interface for displaying historical information associated with the service level operational status of a back end system selected from the list of assets shown in FIG. 1.

FIG. 4 illustrates an example of a GUI 32 displaying the status history for the Back-End Real-Time System ASOC_SA. This display is generated by selecting the ASOC_SA selector box from the group of Back-End Real-Time System selector boxes 22. The display provides a list 34 of the status history for ASOC_SA. The history includes the results of the last eighteen (18) status tests conducted at five-minute intervals.

Figure 5A:
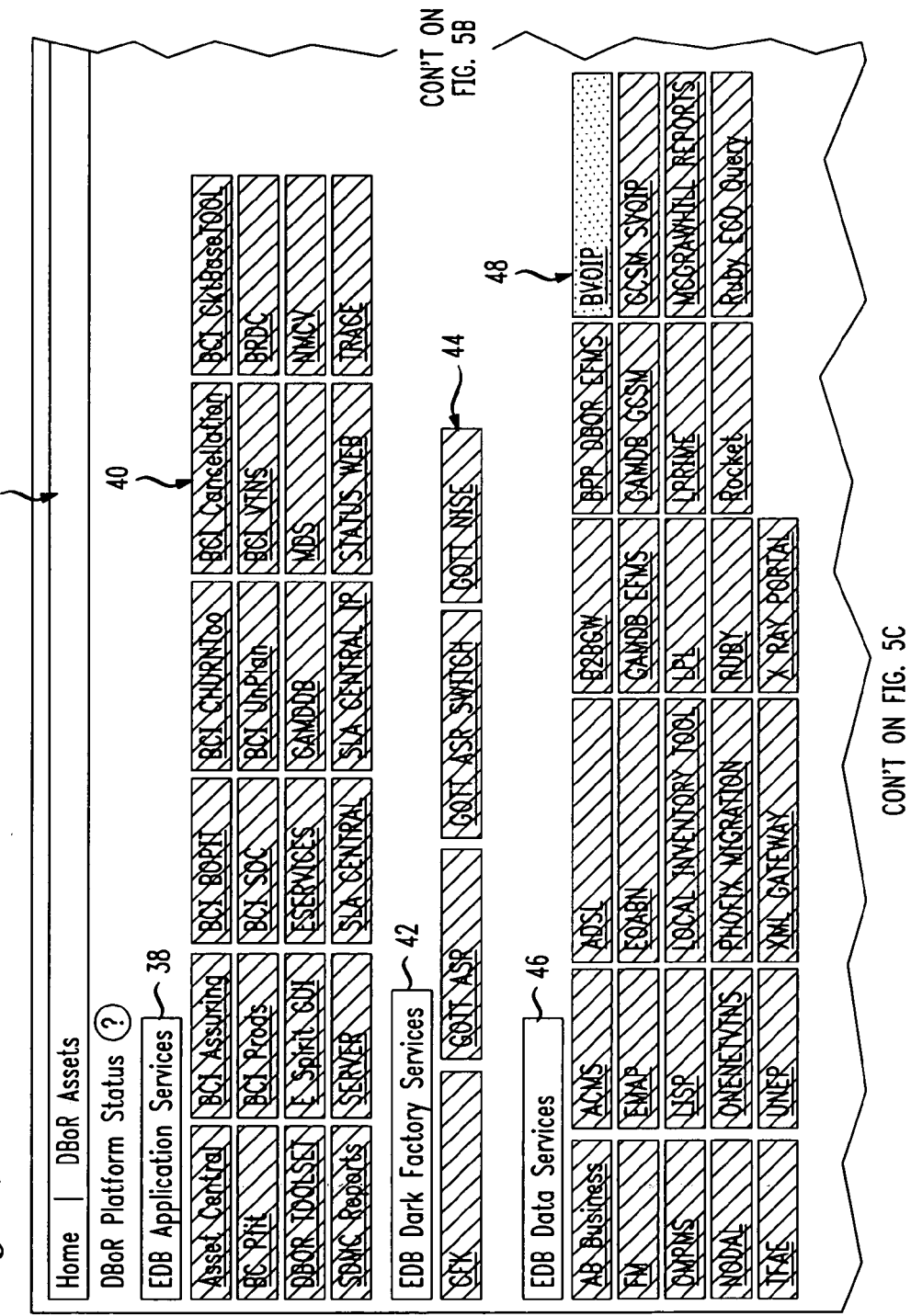
FIG. 5 illustrates another example of a graphical user interface for displaying a list of assets associated with an IT infrastructure and showing the operational status of those assets.
Figure 5B:
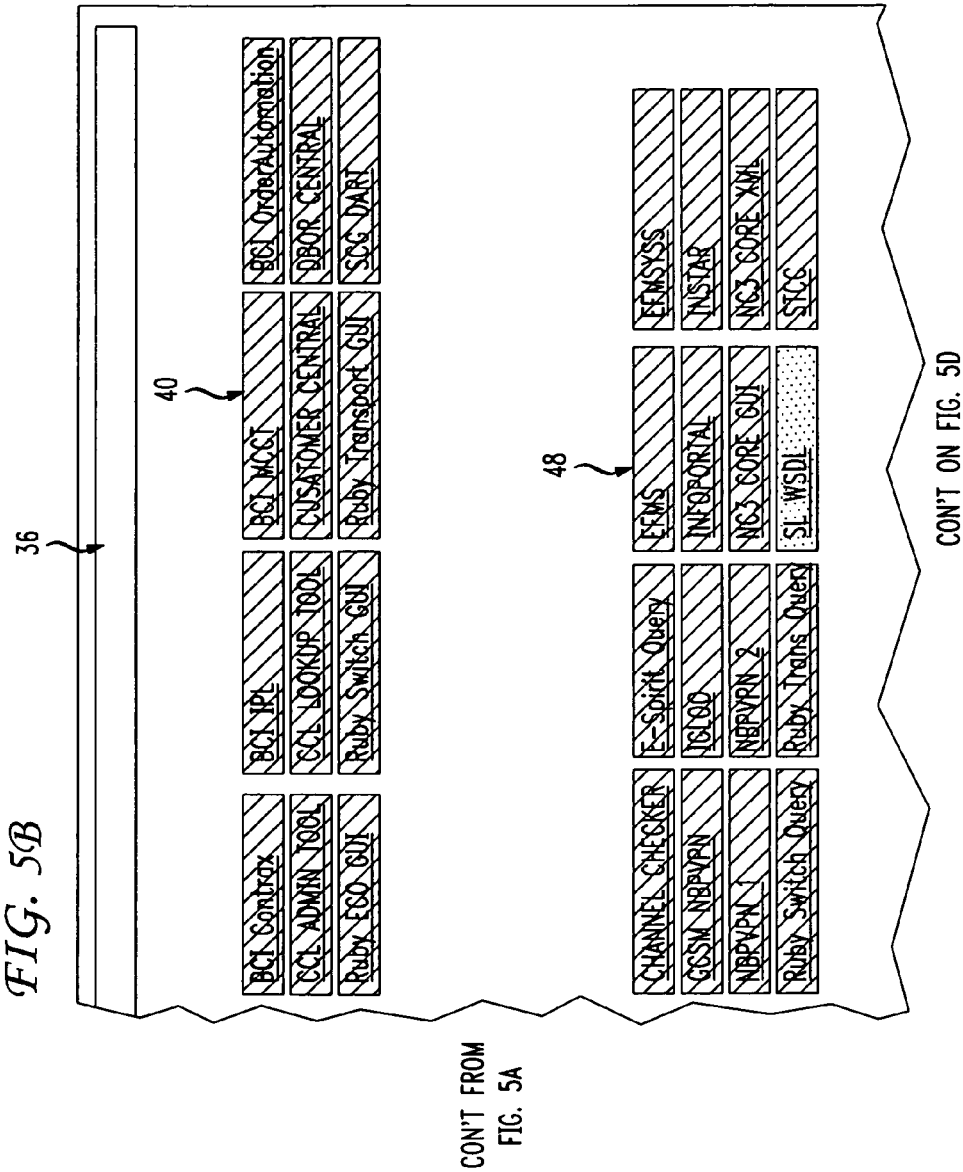
Figure 5C:
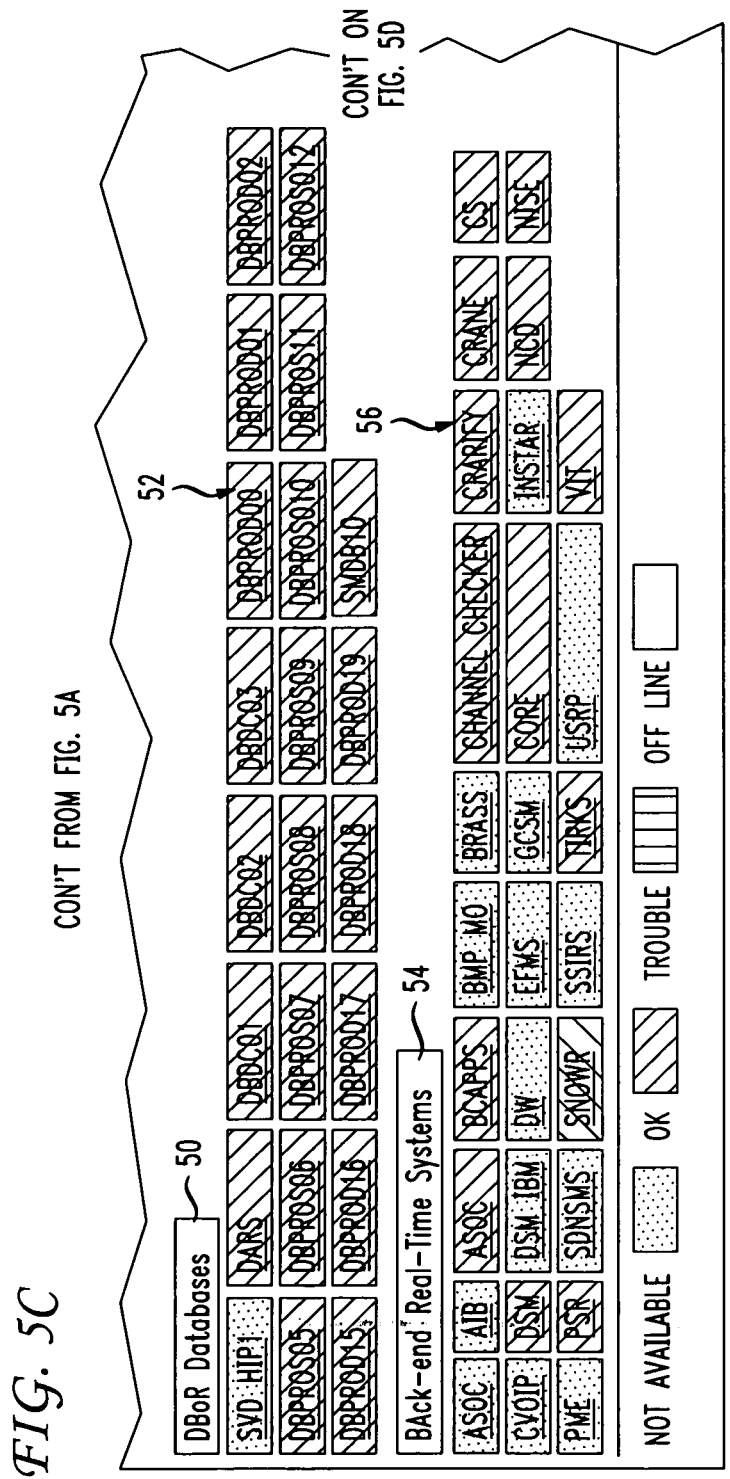

FIG. 5 illustrates another example of a GUI 36 for displaying a list of assets and showing the operational status of those assets. The GUI 36 displays assets for the business service DBoR and includes additional assets compared to those identified in FIG. 1. The categories of assets displayed include Application Services, Dark Factory Services, Data Services, Databases and Back End Real Time Systems. Under the Application Services category heading 38 is displayed a group of selector boxes 40 that includes each of the Application Services associated with DBoR. The selector boxes 40 provide an indication of the operational status for each of the Application Services listed. The color of the selector box indicates the status of the particular Application Service, as discussed above with respect to FIG. 1.

Under the Dark Factory Services category heading 42 is displayed a group of selector boxes 44 that includes each of the Dark Factory Services associated with DBoR. The selector boxes 44 provide an indication of the operational status for each of the Dark Factory Services listed. Similar to FIG. 1, discussed above, the color of the selector box indicates the status of the particular Dark Factory Service.

Under the Data Services category heading 46 is displayed a group of selector boxes 48 that includes each of the Data Services associated with DBoR. The selector boxes 48 provide an indication of the operational status for each of the Data Services listed. Similar to FIG. 1, discussed above, the color of the selector box indicates the status of the particular Data Service.

Under the Databases category heading 50 is displayed a group of selector boxes 52 that includes each of the Databases associated with DBoR. The selector boxes 52 provide an indication of the operational status for each of the Databases listed. Similar to FIG. 1, discussed above, the color of the selector box indicates the status of the particular Database.

Under the Back-End Real-Time Systems category heading 54 is displayed a group of selector boxes 56 for each of the Back-End Real-Time Systems associated with DBoR. The selector boxes 56 provide an indication of the operational status for each of the Back-end Real-Time Systems listed. Similar to FIG. 1, discussed above, the color of the selector box indicates the status of the particular Back-End Real-Time System. As discussed with regard to FIG. 1, a user can select any of the specific Application Services, Dark Factory Services, Data Services, Databases or Back End Real Time Systems to display a status history of the selected asset.

FIG. 6 illustrates an example of a GUI 58 displaying the status history for the Dark Factory System GOTT-ASR. This display is generated by selecting the GOTT-ASR selector box from the Dark Factory System selector boxes 44. The display provides a list 60 of the status history for GOTT-ASR. The history includes the results of the last eleven (11) status tests conducted at about ten minute intervals. The display also includes a test selector box 62 for performing a current status test for GOTT-ASR and a dependencies selector box 64 for selectively displaying additional service level information associated GOTT-ASR.

In another aspect, the invention is directed to a system for providing service level operational status associated with an information technology infrastructure. The system includes a network, a memory device and a computing device in communication with the memory device. The memory and computing devices are coupled to the network and are operative to perform the steps of displaying a list of assets associated with the information technology infrastructure, the list comprising at least one asset having a service level feature and performing at least one service level function; determining the service level operational status of the at least one asset; and displaying a status indicator associated with the at least one asset. The memory and computing devices can also be operative to perform the step of providing a list of all or substantially all assets associated with a specific business service, and having service level features or performing at least one service level function, and providing information relating to the status of each such asset.

Various features of the system may be implemented in hardware, software, or a combination of hardware and software. For example, some features of the system may be implemented in one or more computer programs executing on programmable computers. In addition, each such computer program may be stored on a storage medium such as read-only-memory (ROM) readable by a general or special purpose programmable computer or processor, for configuring and operating the computer to perform the functions described above.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of providing service level operational status associated with an information technology infrastructure, the method comprising:

categorizing, using a processing device, assets associated with the information technology infrastructure by categories, the categories selected from a group consisting of application, database, back-end system, schema and extract-transfer-load project;

displaying, using the processing device, the assets as selectable areas associated with the categories, the selectable areas comprising a first selectable area associated with an asset that performs a plurality of service level functions;

performing, using the processing device, a plurality of test routines associated with the plurality of service level functions associated with the asset during a plurality of periods;

receiving, using the processing device, responses from the asset in connection with the plurality of test routines that have been performed; and evaluating, using the processing device, the responses that have been received by comparison to expected responses, time required to receive the responses, and failure to receive responses in connection with the plurality of test routines that have been performed;

determining, using the processing device, for each period a service level operational status of the asset based on the evaluation;

characterizing, using the processing device, at least a portion of the first selectable area associated with the asset to indicate the service level operational status of the asset during a current period; and displaying, using the processing device, a status history of the asset that includes a status indicator representing the service level operational status during each of the plurality of periods in response to selection of the first selectable area, the status history including a selector selectable to update the service operational status of the asset during the current period.

2. The method according to claim 1, wherein the assets are selected from a group consisting of a database, back-end system, application, schema, and extract-transfer-load project.

3. The method according to claim 1, wherein the service level operational status of the asset includes an indication of a functional state of the asset associated with performing the plurality of service level functions.

4. The method according to claim 3, wherein the functional state is selected from a group consisting of an unavailable state, functioning normal state and trouble state.

5. The method according to claim 1, further comprising displaying historical information associated with the service level operational status of a selected asset in response to receiving a request for the historical information associated with the selected asset.

6. The method according to claim 5, further comprising determining current service level operational status of the selected asset in response to receiving a request for the current service level operational status.

7. The method according to claim 5, further comprising displaying additional service level information associated with the selected asset and a business service supported by the information technology infrastructure in response to receiving a request for the service level information associated with the selected asset.

8. The method according to claim 7, wherein the additional service level information includes service level information for assets associated with the selected asset and the business service.

9. A tangible computer readable storage device having instructions stored thereon that, when executed by a processing device, cause the processing device to perform operations comprising:

categorizing assets associated with an information technology infrastructure by categories, the categories selected from a group consisting of application, database, back-end system, schema and extract-transfer-load project;

displaying the assets as selectable areas associated with the categories, the selectable areas comprising a first selectable area associated with an asset that performs a plurality of service level functions;

performing a plurality of test routines associated with the plurality of service level functions of the asset during a plurality of periods;

receiving responses from the asset in connection with test routines that have been performed; and evaluating the responses that have been received by comparison to expected responses, time required to receive the responses, and failure to receive responses in connection with the plurality of test routines that have been performed;

determining for each period a service level operational status of the asset based on the evaluation;

characterizing at least a portion of the first selectable area associated with the asset to represent the service level operational status of the asset during a current period; and displaying a status history of the asset that includes a status indicator representing the service level operational status during each of the plurality of periods in response to selection of the first selectable area, the status history including a selector selectable to update the service operational status of the asset during the current period.

10. The tangible computer readable storage device according to claim 9, wherein the assets are selected from a group consisting of a database, back-end system, application, schema, and extract-transfer-load project.

11. The tangible computer readable storage device according to claim 9, wherein the operations further comprise displaying historical information associated with the service level operational status of a selected asset in response to receiving a request for the historical information associated with the selected asset.

12. A system to provide service level operational status associated with an information technology infrastructure, the system comprising:

a processing device; and a storage device to store instructions that, when executed by the processing device, cause the processing device to perform operations comprising:
  categorizing assets associated with an information technology infrastructure by categories, the categories selected from a group consisting of application, database, back-end system, schema and extract-transfer-load project;
  displaying the assets as selectable areas associated with the categories, the selectable areas comprising a first selectable area associated with an asset that performs a plurality of service level functions;
  performing a plurality of test routines associated with the plurality of service level functions of the asset during a plurality of periods;
  receiving responses from the asset in connection with the plurality of test routines that have been performed; and
  evaluating the responses that have been received by comparison to expected responses, time required to receive the responses, and failure to receive responses in connection with the plurality of test routines that have been performed;
  determining for each period a service level operational status of the asset based on the evaluation;
  characterizing at least a portion of the first selectable area associated with the asset to represent the service level operational status of the asset during a current period; and
  displaying a status history of the asset that includes a status indicator representing the service level operational status during each of the plurality of periods in response to selection of the first selectable area, the status history including a selector selectable to update the service operational status of the asset during the current period.

13. The system according to claim 12, wherein the operations further comprise displaying historical information associated with the service level operational status of a selected asset in response to receiving a request for the historical information associated with the selected asset.

14. The system according to claim 13, wherein the operations further comprise displaying additional service level information associated with the selected asset and a business service supported by the information technology infrastructure in response to receiving a request for the additional service level information associated with the selected asset.

* * * * *